Dec. 8, 1959 P. R. MARVIN 2,916,398

ADHESIVE TAPE WITH A GAS PLATED METAL FILM FOR A CONDUCTOR

Original Filed Oct. 7, 1954

INVENTOR
PHILIP R. MARVIN

BY Toulmin & Toulmin

ATTORNEYS

United States Patent Office 2,916,398
Patented Dec. 8, 1959

2,916,398

ADHESIVE TAPE WITH A GAS PLATED METAL FILM FOR A CONDUCTOR

Philip R. Marvin, Dayton, Ohio, assignor, by mesne assignments, to Union Carbide Corporation, New York, N.Y., a corporation of New York Original application October 7, 1954, Serial No. 460,963. Divided and this application August 11, 1955, Serial No. 529,878

2 Claims. (Cl. 117—68)

This invention relates to adhesive tapes, sheets, and the like, and more particularly to a method of preparing adhesive tapes or sheeting having a metallized surface.

It is an object of the invention to provide a tape or sheet comprising a continuous metal layer or coating on a backing or base such as formed by cloth, paper, wool, silk or transparent media, for example regenerated cellulose or the like, which tape carries an adhesive for attachment of the same to surfaces.

Another object of the invention is to provide a tape or continuous sheet of the type described which has a metallized outer coating film deposited by gas plating, and which may be applied to the continuously moving tape or sheet.

Another object of the invention is to provide a tape or sheet of the character described, which has an adhesive backing and a metallized film on the opposite surface, and which is useful as a flexible electrical conductor.

Another object of the invention is to provide a metallized pressure-sensitive tape having like uses as conventional tapes of this character.

Another object of the invention is to provide a metallized tape or sheeting which has a pressure-sensitive adhesive surface and is useful in making printed circuits, the same being secured in place by short lengths of non-electrical conducting tape or rivets.

Still another object of the invention is to provide an adhesive coated metallized tape of the character described which is tough and flexible, and wherein the metallized surface is continuous and forms an electrical conducting surface.

A further object of the invention is to provide a tape or sheet of the character described, which is flexible and which has a metallized surface, and wherein the base or body of the tape is formed of glass fibers or a mixture of cellulose fibers and glass fibers, the same being imbedded or interwoven therewith to produce a web which has high tensile strength.

A still further object of the invention is to provide an improved method of producing a metallized adhesive tape which is tough and flexible and provides a useful electrical conductor which is flat and of high tensile strength.

These and other objects and advantages of the invention will become apparent from the following description taken in connection with the drawing wherein one embodiment of the invention is illustrated.

Figures 1, 4:
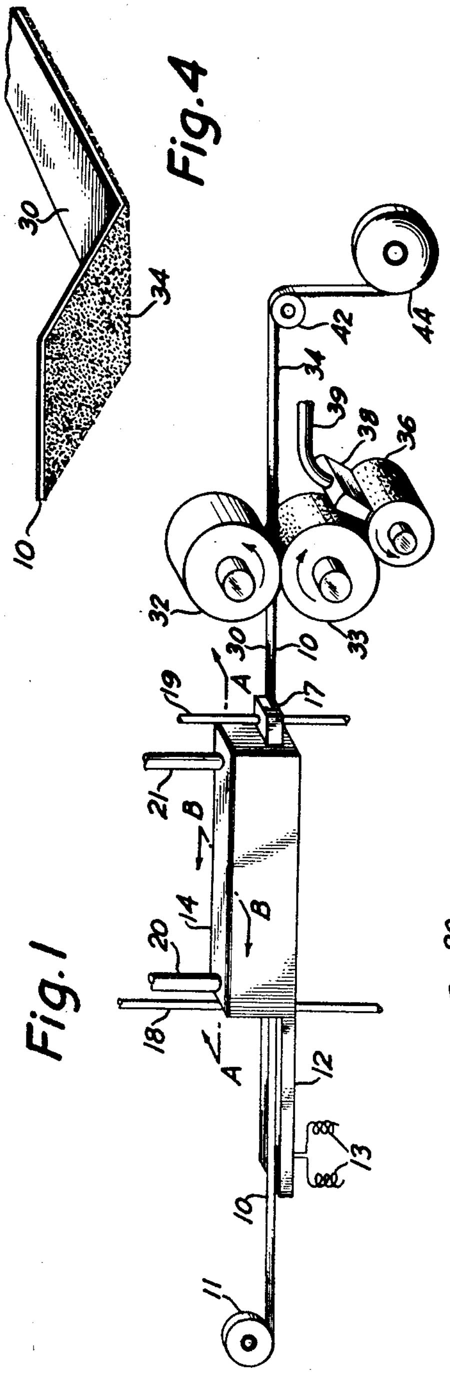
Figure 1 illustrates schematically in elevation an apparatus and method for forming the metallized surface film on a tape and applying adhesive to the backing surface of the tape.
Figure 4 is a view in perspective of a section of an adhesive tape having a metallized surface and made in accordance with this invention.

Referring to the drawing in detail and wherein one embodiment of the invention is illustrated, according to the embodiment shown a transparent tape (such as cellophane) film 10 is unwound from a storage roll 11 as shown, and advanced over a heating pad 12, the same being suitably heated by electrical resistors as supplied through the electrical circuits 13. The heated tape is then passed through a gaseous plating chamber 14 which is filled with heat decomposable gaseous metal compound, of a metal which is to be plated onto the surface of the tape.

Figures 2, 3:
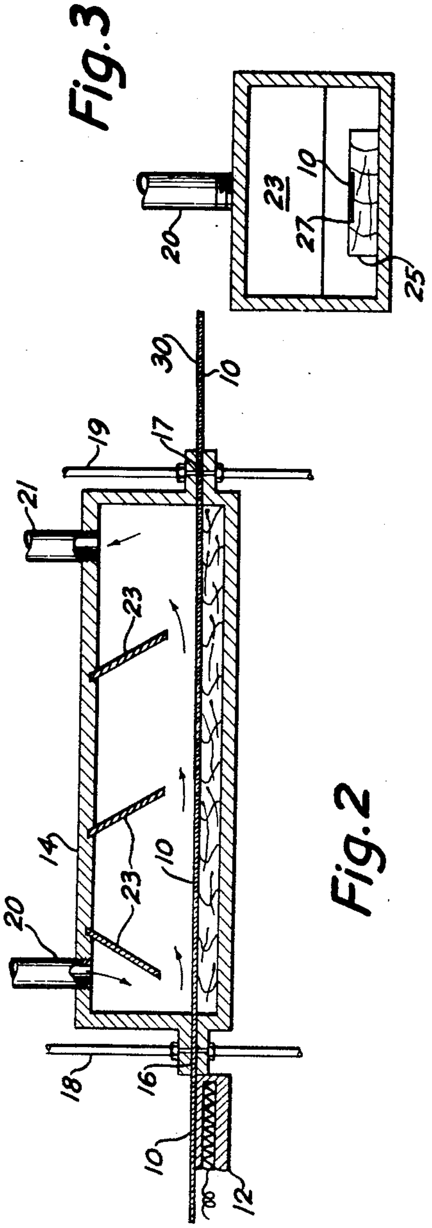
Figure 2 is a cross-sectional view taken substantially on the line A—A of Figure 1, and looking in the direction of the arrows.
Figure 3 is a like cross-sectional view taken substantially on the line B—B of Figure 1, and looking in the direction of the arrows.

As illustrated in Figure 2, the chamber 14 is provided at opposite ends with gas locks 16 and 17, inert gas such as $CO_2$ being introduced through the conduits 18 and 19 respectively to provide a gaseous seal for the plating chamber 14. The pressure of the carbon dioxide in the gas locks 16 and 17 is maintained sufficiently high to prevent leakage outwardly from the chamber of the gaseous metal compound. Gaseous metal compound, together with or without a carrier inert gas such as $CO_2$ is admitted to the chamber 14 through an inlet conduit 20 and circulated over the heated tape 10 and discharged through the outlet opening 21 at the opposite end of the chamber.

Baffle means 23 are arranged in the chamber 14 to deflect the gaseous metal downwardly and in contact with the moving tape. The tape 10 is suitably supported on a mould form 25 which extends lengthwise of the chamber 14. This mould or support 25 preferably is made of wood or the like material which has a low thermal conductivity. The mould 25 is preferably provided with a depression 27 in the upper surface, which is of a dimension to fit the tape so that the upper surface of the tape will be exposed to gaseous plating and the sides and bottom are substantially protected to prevent the plating of metal thereon. During passage of the tape through the gas plating chamber 14 metal is deposited thereon by decomposition of the heat decomposable gaseous metal compound, and a deposit of the metal constituent formed thereon, as at 30.

The metallized sheet, after passing through the gaseous metal plating chamber 14 is drawn upwardly between the operating rolls 32 and 33 and coated with adhesive material 34 on the opposite or underside of the tape. For accomplishing this the roll 33 is supplied with adhesive from a spreader roll 36 which is arranged to receive adhesive material through the adaptor 38 which is connected to a source or storage of adhesive through a conduit 39. The metallized adhesive tape is then passed over a guide roll 42 and is rolled up on a storage roll 44.

A finished adhesive tape having a metallized surface is made in accordance with this invention as illustrated pictorially in Figure 4.

The gas plating may be carried out as the tape or sheet is continuously moved through the apparatus utilizing the apparatus and method similarly as described in U.S. Patents Nos. 2,332,309 and 2,344,138. The gas plating of dense coatings may be produced by exposing the tape in the plating chamber to atmosphere containing carbon dioxide or carbonyl, such as nickel, copper or the like, for a period of time varying from a few seconds to a minute or more, depending upon the thickness of the metal coating desired.

A metal film may be applied to the tape by decomposing gaseous metal carbonyl to effect a layer of metal thereon of a thickness of 0.00001 inch to 0.00025 inch, as described in U.S. Patent 2,475,601.

For the plating of copper or nickel carbonyls the tape is preferably warmed to a temperature just below its softening point and which may be between about 250°

F.–375° F. The plating may be effected utilizing metals which form gaseous carbonyls through plating chromium, iron, tungsten, cobalt, molybdenum and the like metals. Further, where desired the plating may be subjected to a post heat treatment after plating of the tape so as to produce a less porous metal film.

The body or supporting base of the tape or sheeting may be made of fibrous material such as paper, cotton, wool, silk, or regenerated cellulose such as transparent sheet material, for example cellophane. Further, where a relatively high tensile strength tape or sheeting material is desired, the same may be formed of glass fibers, either alone or admixed with cellulose fiber, and wherein the glass fibers are interwoven or felted therewith, or suitably imbedded into the body of the tape to thus provide a tape having a high tensile strength. Moreover, colored glass fibers may be used, or fabric formed therefrom, which may be readily metallized and coated with adhesive as described. A textile fabric made of glass fibers which fibers are of relatively small diameter, e.g., one micron or less, and of uniform dimensions provide a base for forming a tape. Fibrous base cellulosic material containing mixtures of wool or silk, or synthetic fibers for example of polyamine type such as nylon also may be utilized as a base upon which the metal is applied and an adhesive to form a tape.

Where an electrical conductor tape is desired of high tensile strength, the same may be made of nylon or the like synthetic fiber which is subjected to metallizing and an adhesive applied to the opposite surface to provide an electrical conducting tape which is useful in the electrical field. Electrical tapes of this type may be used as windings around a plastic core to form a strong coaxial cable.

The adhesive composition as applied to the tape may be of a pressure-sensitive type or a re-moistening adhesive which possesses high resistance to atmospheric humidity. Pressure-sensitive adhesives of the water-insoluble type include generally as essential ingredients rubber and rosin. The adhesive mass may comprise a resin, a non-volatile plasticizer for the resin in a film-forming vehicle which produces a composition applicable as a relatively thin coating to provide a tacky adhesive coating. By varying the proportionate amounts of the ingredients, the composition may be made pressure-sensitive or tacky, as desired.

Film-forming constituents may be made of cellulose esters, such as cellulose acetate, cellulose butyrate and cellulose propionate, cellulose ethers, such as benzyl cellulose and ethyl cellulose and polyvinyl chloride or mixtures thereof, and various types of chlorinated rubber.

For plasticizing the composition phthalyl glycollates such as butyl phthalyl glycollate, methyl phthalyl ethyl glycollate and ethyl phthalyl ethyl glycollate, also hydrogenated methyl abietate may be used, or other non-volatile plasticizers such as dibutyl phthalate or chlorinated diphenyls may be employed.

The ingredients forming the adhesive composition are brought together by mixing the same on a mill such as a rubber mill, and after incorporating the solvents such as acetone and the like, the liquid adhesive is applied to the tape by the spreader roll as illustrated in Figure 1. The addition of pigments to provide different colored adhesives such as zinc oxide to provide a white adhesive, or iron oxide for red, etc. may be utilized.

Where an adhesive material of the re-moistening type is desired, use may be made of animal glue, dextrin, bone glue, and fish glue, and various combinations of these substances may be utilized. All of these adhesives are readily re-moistened but are not as water resistant as the pressure-sensitive type described. The particular adhesive used whether of the pressure-sensitive or hydrophillic re-moistening type depends upon the tape or sheeting being made and the ultimate uses to which it is to be put. In all cases the adhesive layer is flexible.

The quantity of the adhesive applied to the backing material and forming the tape may also be varied in accordance with the service to be performed by the tape. Also a dry adhesive layer may be applied as, for example powdered rosin and the like. It is preferable, however, to use adhesive which is resistant to humidity and water vapor to permit the storage and use of the material under high humidity conditions without deterioration.

While in the foregoing specification there has been described a particular embodiment of the invention as applied to tapes, it will be understood that the invention is also applicable to the preparation of metallized sheets to which adhesive material may be applied during use of the metallized sheet or tape. It will be understood, therefore, that the example given is merely illustrative of the invention and how it may be used, the invention may be produced in a wide variety of ways and may be made using aqueous metal plating for applying the metal to one side or both sides of a sheet or tape, as may be desired.

Further well known chemical equivalents and substitutes therefor may be made without departing from the spirit and scope of the invention as set forth in the appended claims.

This application is a division of my application Serial Number 460,963, filed October 7, 1954.

What is claimed is:

1. A method of making an adhesive tape or sheet having a metallized outer surface which consists in providing a flexible sheet made of fibrous material, heating said fibrous sheet at a temperature above the decomposition temperature of a heat-decomposable gaseous metal compound and below the softening point of the material of the sheet, moving said sheet therealong and through a chamber, subjecting said heated sheet to an atmosphere containing carbon dioxide gas and a heat-decomposable gaseous metal carbonyl, heat decomposing the gaseous metal carbonyl compound to cause deposition of the metal constituent onto said sheet as the same is moved therealong, said metal constituent being deposited as a continuous layer having a thickness of between 0.00001 inch to 0.00025 inch, and then applying a hydrophilic adhesive layer composed of dextrin to one side of said sheet to form a finished product.

2. An article of manufacture made in accordance with the method of claim 1.

References Cited in the file of this patent

UNITED STATES PATENTS

| | | |
|---|---|---|
| 2,243,237 | Whiley | May 27, 1941 |
| 2,671,034 | Steinfeld | Mar. 2, 1954 |
| 2,684,918 | Oughton | July 27, 1954 |
| 2,689,805 | Croze | Sept. 21, 1954 |
| 2,711,382 | Smith-Johannsen | June 21, 1955 |
| 2,740,732 | Peck | Apr. 3, 1956 |
| 2,754,230 | McLean | July 10, 1956 |
| 2,785,651 | Pawlyk | Mar. 19, 1957 |

OTHER REFERENCES

Catalog of Scotch and Industrial Pressure-Sensitive Tapes and Their Uses (Robert Spector Co., 22 Park Place, New York 7, N.Y.), July 1949, pages 4 and 6 relied on. (Copy available in Div. 25.)